US006845952B2

United States Patent
Abel et al.

(10) Patent No.: US 6,845,952 B2
(45) Date of Patent: Jan. 25, 2005

(54) FLYWHEEL PROGNOSTIC HEALTH AND FAULT MANAGEMENT SYSTEM AND METHOD

(75) Inventors: Stephen G. Abel, Chandler, AZ (US); Calvin C. Potter, Mesa, AZ (US); Sharon K. Brault, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 126 days.

(21) Appl. No.: 10/340,480

(22) Filed: Jan. 10, 2003

(65) Prior Publication Data

US 2004/0135034 A1 Jul. 15, 2004

(51) Int. Cl.⁷ .................................................. B64G 1/28
(52) U.S. Cl. ........................... 244/165; 701/220; 74/574
(58) Field of Search ................ 244/14–165; 701/220; 74/574; 310/90.5, 51

(56) References Cited

U.S. PATENT DOCUMENTS

| 3,958,111 | A | | 5/1976 | Hackett |
| 3,999,729 | A | * | 12/1976 | Muhlfelder et al. ........ 244/3.21 |
| 5,279,483 | A | * | 1/1994 | Blancke et al. ............. 244/165 |
| 6,113,033 | A | * | 9/2000 | Parks et al. ................. 244/165 |
| 6,262,505 | B1 | * | 7/2001 | Hockney et al. ............... 74/574 |
| 2003/0149529 | A1 | * | 8/2003 | Heatwole et al. ........... 701/220 |

\* cited by examiner

*Primary Examiner*—Galen Barefoot
(74) *Attorney, Agent, or Firm*—Douglas A. Mullen, Esq.

(57) ABSTRACT

A prognostic health and fault management system and method that accurately determines the health and rate of degradation of one or more flywheel systems, by comparing actual and simulated responses of flywheel systems to supplied command signals. Based on the determined health status and degradation rate of the flywheel systems, one or more unhealthy, active flywheel systems are deactivated, and one or more healthy, deactivated flywheel systems are activated. The system can be used in terrestrial applications, or in vehicles such as satellites, spacecraft, or ships.

18 Claims, 4 Drawing Sheets

FLYWHEEL PROGNOSTIC HEALTH AND FAULT MANAGEMENT SYSTEM AND METHOD

FIELD OF THE INVENTION

The present invention relates to flywheel energy storage systems and, more particularly, to a system and method of health and fault management for flywheel energy storage systems that can be used in vehicles such as spacecraft.

BACKGROUND OF THE INVENTION

Many satellites and other spacecraft, as well as some terrestrial stationary and vehicle applications, such as sea-going vessels, include electrical distribution systems that have both a primary electrical power source and a backup electrical power source. For example, many satellites include an array of solar cells, which may be attached to the satellite itself or to solar panels that extend from the satellite. The solar arrays are typically the primary electrical power source whenever the satellite is exposed to the sun. However, a satellites can experience periodic eclipses from the sun when the satellite's orbit moves it into the Earth's shadow. During these eclipse periods, a backup power source is used to supply electrical power. In addition, while the solar arrays may be sized to handle at least nominal design power loads, the arrays may not be sized to handle transient and/or peak design power loads. Thus, the backup power source may also be used during periods of transient and/or peak power demands to augment the solar arrays.

In some spacecraft systems, the backup power source is one or more rechargeable batteries. During eclipse periods, transients, and/or peak power demand periods, the batteries supply some or all of the electrical power to the satellite's electrical distribution system, causing the batteries to discharge. Thereafter, the batteries are recharged to capacity using excess electrical energy from the solar arrays. The lifetime of many batteries is limited according to a number of charge-discharge cycles. In addition, some batteries are relatively heavy. Thus, some satellites plan to include one or more energy storage flywheel systems to either supplement or replace batteries as the backup power source. In some satellite concepts, energy storage flywheel systems are used as both a backup power source, and to supply attitude control for the satellite.

Energy can be stored in various forms, including as electrical energy or as mechanical kinetic energy. Energy storage flywheel systems may be thought of as "mechanical batteries," that convert electrical energy into rotational kinetic energy, and rotational kinetic energy into electrical energy. Energy storage flywheel systems can include one or more flywheels that are rotationally mounted using magnetic bearings, and that are coupled to a motor/generator and, if also used for attitude control, may be coupled to a gimbal actuator. To convert electrical energy to rotational kinetic energy, the motor/generator is operated in a motor mode and is used to rotate the flywheel up to a relatively high rotational speed. To convert the stored kinetic energy to electrical energy, the motor/generator is operated in a generator mode and is rotated by the flywheel to generate electrical energy. This action is controlled in such a manner to provide stable power bus voltage.

As with electrochemical batteries, the lifetime of an energy storage flywheel system may be limited. Such limitation may be due to the structure of the flywheel itself, or to the various systems and components that make up the flywheel system. Each one of these systems and components may gradually degrade over time, or fail at some point, which can adversely affect the satellite's mission and/or lifetime. Although some satellites are provided with redundant flywheel systems in the event of a failure, the capability to detect and, if necessary, deactivate a degrading flywheel system, and to activate a spare flywheel system before a complete failure, is presently not believed to be available.

Hence, there is a need for a system and method for monitoring one or more energy storage flywheel systems that can accurately determine the health and/or rate of degradation of one or more systems and components within the energy storage flywheel system, and/or activate a deactivated spare flywheel system before the complete failure of an active flywheel system. The present invention addresses one or more of these needs.

SUMMARY OF THE INVENTION

The present invention provides a prognostic health and fault management system and method for energy storage flywheel systems that accurately determines the health and rate of degradation of the flywheel system by monitoring the health and degradation rate of various systems and components within the flywheel system. The prognostic health and fault management system also provides the capability to activate a deactivated spare flywheel system based on the determined health status of the active flywheel systems. A satellite is also provided that includes the innovative system.

In one embodiment, and by way of example only, an energy storage and supply system includes one or more energy storage flywheels, one or more simulation models, and a prognostic controller. Each of the energy storage flywheels is coupled to receive one or more flywheel command signals and is operable, in response thereto, to supply one or more actual flywheel response signals. Each simulation model is of at least a portion of each energy storage flywheel. Each simulation model is coupled to receive the one or more flywheel command signals and is operable, in response thereto, to supply one or more simulation model response signals. The prognostic controller is coupled to receive one or more of the actual flywheel response signals and one or more of the simulation model response signals and is operable, in response thereto, to supply one or more signals to selectively activate and deactivate one or more of the energy storage flywheels.

In another exemplary embodiment, a method of monitoring the health of an energy storage and supply system having one or more energy storage flywheels includes supplying one or more flywheel commands to each of the energy storage flywheels and to a simulation model of at least a portion of each of the energy storage flywheels. An actual response of each energy storage flywheel to each of the supplied commands is monitored, as is a simulated response of each simulation model to each of the supplied commands. Each of the actual responses is compared to each of the simulated responses, and one or more of the energy storage flywheels is selectively activated and deactivated based on the comparison.

Other independent features and advantages of the preferred health and fault management system and method will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a spacecraft. Thus, although the present embodiment is, for convenience of explanation, depicted and described as being implemented in a satellite, it will be appreciated that it can be implemented in other systems and environments, both terrestrial and extraterrestrial.

Figure 1:
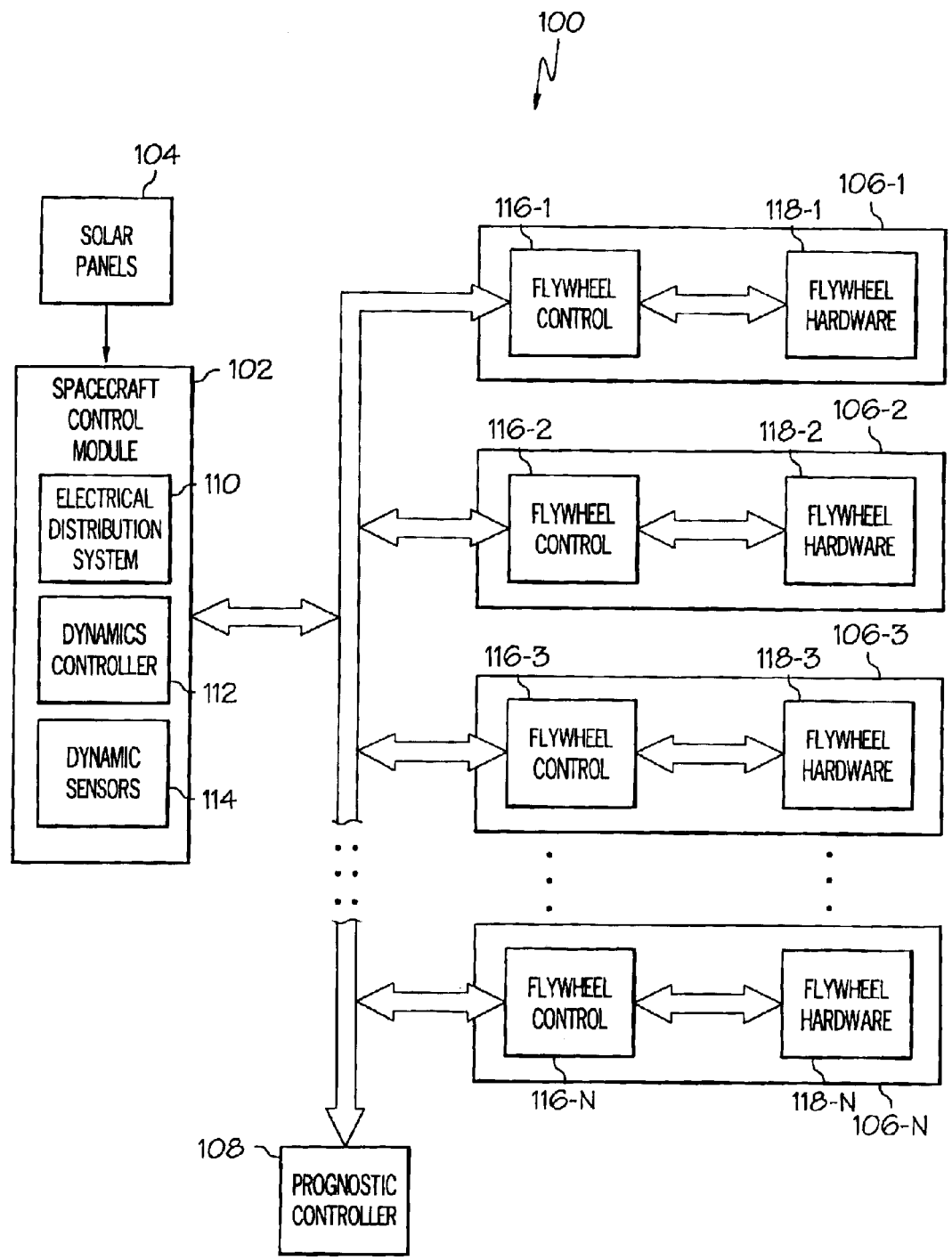
FIG. 1 is a simplified functional block diagram of an exemplary embodiment of a multi-channel energy supply and storage system in a spacecraft.
Figure 2:
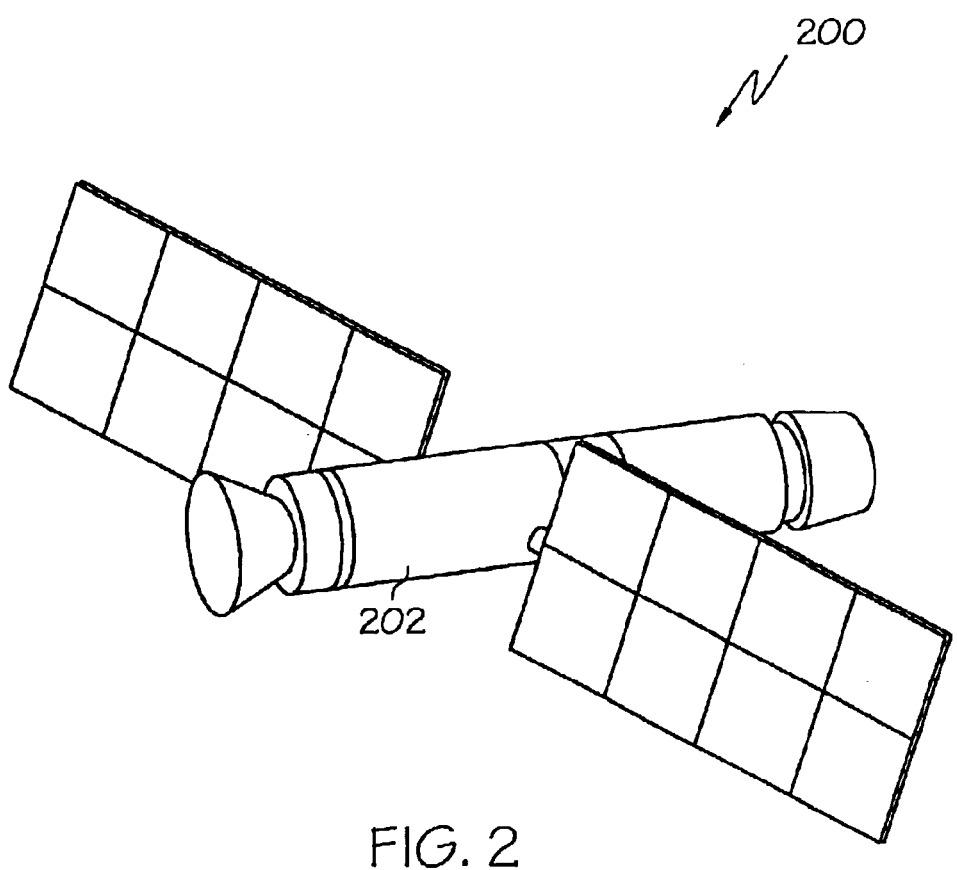
FIG. 2 is a perspective view of a physical embodiment of a satellite system that may incorporate the system of FIG. 1.

Turning now to the description, and with reference first to FIG. 1, a functional block diagram of an exemplary multi-channel energy supply and storage system 100 for a spacecraft is shown. The system 100 includes a spacecraft control module 102, one or more solar panels 104, a plurality of energy storage flywheel systems 106 (106-1, 106-2, 106-3, . . . 106-N), and a prognostic processor 108. A perspective view of an exemplary physical embodiment of a spacecraft 200 that may use the system 100 is illustrated in FIG. 2.

The spacecraft control module 102 monitors and controls the overall operation of the spacecraft. The spacecraft control module 102 receives attitude commands from, for example, an earthbound station or its onboard autopilot, and controls the operation of the gimballed flywheels, which act as control moment gyroscopes. In the depicted embodiment, the spacecraft control module 102 includes, among other things, a major portion of the spacecraft electrical distribution system 110, a spacecraft dynamics controller 112, and one or more spacecraft dynamic sensors 114. These individual systems and components are not necessary to understand any of the described embodiments and are, therefore, not separately described in detail.

The solar panels 104 include an array of solar cells that convert light energy into electrical energy. The solar panels 104 may be attached to the satellite itself or to fixed or moveable structures that extend from the satellite. The solar panels 104 provide the primary source of electrical power to the spacecraft electrical power distribution system 10. However, when the spacecraft 200 is positioned such that it does not receive sunlight, such as, for example, when it is in the Earth's shadow, a backup electrical power source is needed. As will be described more fully below, the flywheel systems 106 function, among other things, as this backup power source.

Figure 3:
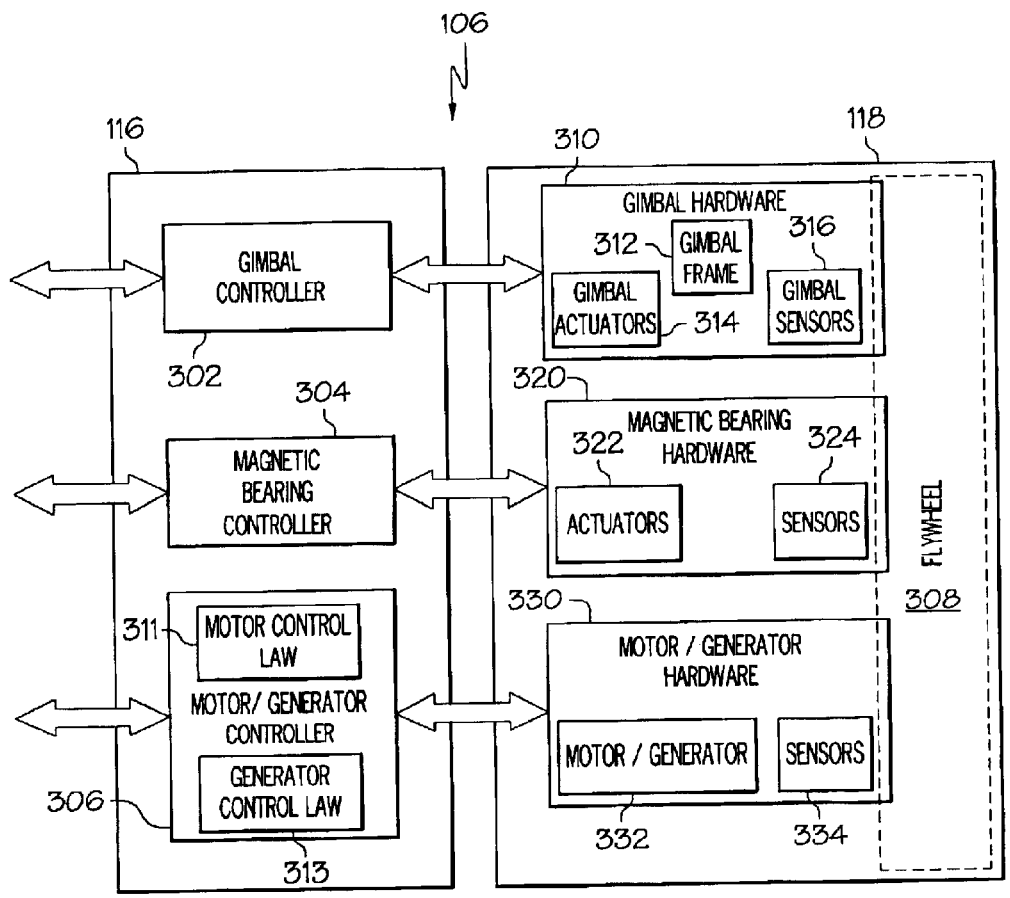
FIG. 3 is a functional block diagram of an exemplary embodiment of one channel of the system of FIG. 1.

The system includes N number of energy storage flywheel systems 106 (106-1, 106-2, 106-3, . . . 1-6-N). The system is preferably configured so that one or more of the flywheel systems 106 is active, while one or more of the remaining flywheel systems 106 is in a standby, deactivated state. Thus, the system 100 is at least single fault tolerant. The energy storage flywheel systems 106 each include a flywheel control module 116 (116-1, 116-2, 116-3, . . . 116-N) and flywheel hardware 118 (118-1, 118-2, 118-3, . . . 118-N). The flywheel control modules 116 are each in operable communication with the spacecraft control module 102 and the prognostic processor 108. The spacecraft control module 102 supplies, for example, attitude control commands to the flywheel control modules 116. In turn, the flywheel control modules 116 control the relative attitudes of the associated flywheel hardware 118. As will be discussed more fully below, attitude control of the spacecraft 200 is implemented by controlling, among other things, the relative attitude of one or more rotating flywheels and the associated hardware. The flywheel control modules 116 also monitor the bus voltage of the spacecraft electrical power distribution system 10, and in turn control the operation of the associated flywheel hardware 118 as either a power supply or a power load. The flywheel control modules 116, as is discussed in more detail below, also monitor various parameters of the associated flywheel hardware 118, and supply representative signals to both the spacecraft control module 102 and the prognostic processor 108. A block diagram of one energy storage flywheel system 106 is illustrated in FIG. 3, and will now be discussed in detail.

The flywheel control modules 116 each include three separate controllers, a gimbal controller 302, a magnetic bearing controller 304, and a motor/generator controller 306. The flywheel hardware modules 118 each include an energy storage flywheel 308, gimbal hardware 310, magnetic bearing hardware 320, and motor/generator hardware 330. The gimbal controller 302 receives attitude control commands from the spacecraft control module 102, and supplies appropriate control signals to, and receives various feedback signals from, the gimbal hardware 310, to effect attitude control. At least some of the feedback signals the gimbal controller 310 receives are representative of the gimbal hardware 310 response to the supplied control signals. The gimbal controller 302 supplies one or more of these feedback signals to at least the prognostic processor 108. The gimbal controller 310 may additionally process one or more of the feedback signals to determine whether a fault exists in the gimbal hardware.

In the depicted embodiment, the gimbal hardware 310 includes a gimbal frame 312, one or more gimbal actuators 314, and one or more gimbal sensors 316. The flywheel 308 is mounted in the gimbal frame 312. The gimbal frame 312 is rotationally mounted about one or more gimbal axes, which are perpendicular to the spin axis of the energy storage flywheel 308. The gimbal actuators 314 are coupled to the gimbal frame 312, and are also coupled to receive the control signals from the gimbal controller 302. As is generally known, attitude control in a spacecraft may be implemented by changing the gimbal angles. Thus, in response to the attitude control signals received from the spacecraft control module 102, the gimbal controller 302 supplies appropriate control signals to the gimbal actuators. In response to these control signals, the gimbal actuators appropriately position the gimbal frame 312. The gimbal sensors 316 include sensors that can sense at least the position and rate of the gimbal frame 312, and supply position and rate feedback signals to the gimbal controller 302. One or more temperature sensors may also be included to provide one or more signals representative of the gimbal actuators 314 to the gimbal controller 302.

The magnetic bearing controller 304 may also receive one or more commands from the spacecraft control module 102. The magnetic bearing controller 304, in accordance with a control law, supplies appropriate command signals to, and receives various feedback signals from, the magnetic bearing hardware 320. At least some of the feedback signals received by the magnetic bearing controller 304 are representative of the magnetic bearing hardware 320 response to the supplied control signals. Similar to the gimbal controller 302, the magnetic bearing controller 304 supplies one or more of the feedback signals it receives to at least the prognostic processor 108, and may additionally process one or more of the feedback signals to determine whether a fault exists in the magnetic bearing hardware 320.

The magnetic bearing hardware 320 functions to rotationally mount or levitate, in non-contact fashion, the energy storage flywheel 106. In the depicted embodiment, the magnetic bearing hardware 320 implements active magnetic bearings, and includes electromagnetic actuators 322 and position sensors 324. The position sensors 324 sense the position of the flywheel rotor (not illustrated) and supply appropriate position signals to the magnetic bearing controller 304. The magnetic bearing controller 304, in accordance with the control law, supplies the appropriate current magnitude to the electromagnetic actuators 322, which in turn generate magnetic forces of the appropriate magnitude to appropriately position the flywheel rotor. As FIG. 2 also depicts, the magnetic bearing hardware 320 preferably includes one or more temperature sensors 326 to supply signals representative of at least the actuators 322. Although active magnetic bearings are shown in FIG. 3, it will be appreciated that the magnetic bearing hardware 320 could be configured to implement passive magnetic bearings.

The motor/generator controller 306 receives a signal representative of the bus voltage of the spacecraft electrical distribution system 110 and, in response, configures the motor/generator hardware 330 to operate as either a motor or a generator. To do so, the motor/generator controller 306 is configured to selectively implement either a motor control law 311 or a generator control law 313. The motor/generator controller 306 also receives various feedback signals from the motor/generator hardware 330. At least some of the feedback signals received by the motor/generator controller 306 are representative of the motor/generator hardware 330 response to the supplied control signals. The motor/generator controller 306 supplies one or more of the feedback signals it receives from the motor/generator hardware 330 to at least the prognostic processor 108, and may additionally process one or more of the feedback signals to determine whether a fault exists in the motor/generator hardware 330.

The motor/generator hardware 330 includes a motor/generator 332 and one or more sensors 334. The motor/generator 332 may be any one of numerous motor/generator sets known now, or in the future, and includes a main rotor that is coupled to the rotor of the flywheel 308. The sensors 334 include one or more temperature sensors and one or more commutation sensors. When the bus voltage of the electrical distribution system 110 is sufficiently high, the motor/generator controller 306 implements the motor control law 311 and the motor/generator 332 is operated as a motor. During operation as a motor, the motor/generator 332 spins up the flywheel 308, storing rotational kinetic energy. Conversely, when the bus voltage of the electrical distribution system 110 drops to some predetermined magnitude, the motor/generator controller 306 implements the generator control law 313 and the motor/generator 332 is operated as a generator. During its operation as a generator, the motor/generator 332 spins down the flywheel, converting the flywheel's stored rotational kinetic energy to electrical energy.

The prognostic processor 108 is in operable communication with the satellite control module 102 and with each of the flywheel control modules 116-1, 116-2, 116-3, . . . 116-N. The prognostic processor 108 receives at least the same command signals supplied to each of the flywheel control modules 116-1, 116-2, 116-3, . . . 116-N from the satellite control module 102. In addition, as was mentioned in the descriptions above, the prognostic processor 108 receives various feedback signals from each of the flywheel control modules 116-1, 116-2, 116-3, . . . 116-N. These feedback signals include at least those that are representative of the response of each of the flywheel hardware modules 118-1, 118-2, 118-3, . . . 118-N to the received command signals. The prognostic processor 108 uses these received signals, both the command signals and the actual response signals, to determine the health state of each of the energy storage flywheel systems 106.

Specifically, the prognostic processor 108 determines the health state of the energy storage flywheel systems 106, at least in part, by comparing actual flywheel system responses to simulation model responses. To do so, the prognostic processor 108 uses simulation models of each of the energy storage flywheel systems 106-1, 106-2, 106-3, . . . 106-N. These simulation models can be software implemented models that may be stored in either local or remote system memory. The simulation models could also be implemented via firmware or embedded in a hardware circuit. The commands supplied to the energy storage flywheel systems 106 are also supplied to the corresponding simulation models. In turn, the simulation models receiving the commands generate signals representative of the simulation model responses to the command signal. As was noted above, feedback signals representative of the actual responses of each the energy storage flywheel system 106 to the same commands are also supplied to the prognostic processor 108. For each command signal that is supplied to both the energy storage flywheel systems 106 and the simulation models, the prognostic processor 108 compares the actual response signals to the corresponding simulation model response signals. If the corresponding responses differ by a predetermined magnitude, this indicates that the energy storage flywheel system 106 has, or one or more sections of the energy storage flywheel system 106 have, degraded to an "unhealthy" state.

Because the system 100 includes N number of redundant energy storage flywheel systems 106, if an activated energy storage flywheel system 106 becomes unhealthy it can be deactivated, and a deactivated flywheel system 106 can be activated to take its place. Before this transition can take place, however, the prognostic processor 108 first requests authorization from the satellite control module 102. This ensures the transition is performed without, for example, adversely affecting the system 100, without adversely affecting the attitude of the spacecraft, and/or interrupting other operations the satellite control module may be conducting.

Once authorization is obtained from the satellite control module 102, the prognostic processor 108 will deactivate the unhealthy energy storage flywheel system 106, and activate a healthy, deactivated system 106. In the depicted embodiment, the prognostic processor 108 controls this transition by transmitting one or more enable/disable codes to the transitioning energy storage flywheel systems 106. When the transition is complete, the newly activated flywheel system 106 assumes the identity of the unhealthy, newly deactivated flywheel system 106, as far as the remainder of the system 100 is concerned. Thus, all of the command signals from the satellite control module 102 that had been supplied to the unhealthy flywheel system 106, are now redirected to the newly active flywheel system.

In addition to determining the health state of the energy storage flywheel systems 106, the prognostic process 108 also uses the actual and simulation model response comparisons to determine the deterioration rate, if any, of the energy storage flywheel systems 106. This information can be used to predict, and correct for, a potentially impending unhealthy flywheel system 106. This information will also improve the life and quality of operation of future satellite systems. The prognostic processor 108 also monitors, and reports to the satellite control module 102, the array configuration of the energy storage flywheel systems 106. In other words, the prognostic processor 108 supplies, for example, one or more status signals that inform the satellite control module 102 which energy storage flywheel systems 106 are activated and which is/are deactivated. The prognostic processor 108 also determines the normal operational schedules for the energy storage flywheels systems 106. That is, the prognostic processor 108 determines when to periodically deactivate an active energy storage flywheel system 106, and to activate a deactivated energy storage flywheel system 106 to take its place. Periodically activating and deactivating each of the energy storage flywheel systems 106 can increase the lifetime of each individual flywheel system 106, and the overall lifetime of the energy storage and supply system 100. Similar to the operation described above, the prognostic processor 108 preferably obtains authorization from the satellite control module 102 before inactivating and/or deactivating any of the energy storage flywheel control systems 106 as part of the normal operational schedule.

Figure 4:
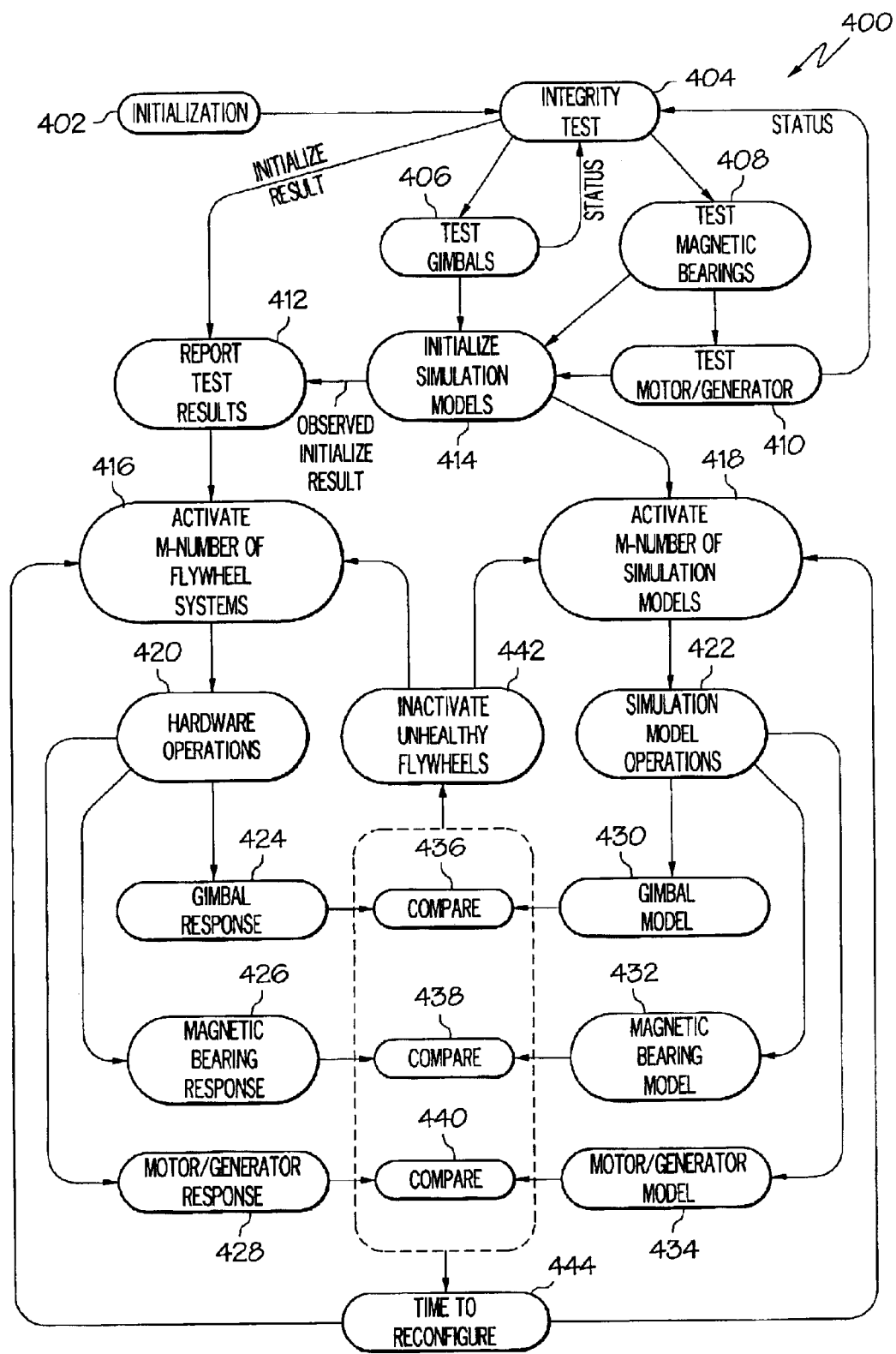
FIG. 4 is a state diagram that shows the operational process carried out by at least a portion of the system of FIG. 1.

An exemplary state diagram illustrating the process generally described above, and that may be implemented by the prognostic processor 108, is shown in FIG. 4 and will now be described. It is noted that the number in parentheses in the following description correlate to the reference numerals associated with each of the depicted states.

As with many systems, the first state is the initialization (402), which preferably begins with a low power start up of the entire system 100. The prognostic processor 108 then initiates integrity tests on all of the energy storage flywheel systems 106-1, 106-2, 106-3, . . . 106-N (404). These tests include diagnostics of each of the N gimbal controller 116 and hardware modules (406), each of the N the magnetic bearing controllers and hardware modules (408), and each of the N motor/generator controller and hardware modules (410). The results of these tests are reported to the satellite control module 102 (412), and are used to initialize the simulation models for each of the energy storage flywheel systems 106 (414).

A number (e.g., M) of the energy storage flywheel systems 106 are then activated and placed into operation in the system 100 (416). The simulation models for each of the M active flywheel systems 106 are also activated (418). The actual and simulation models each receive, and operate in accordance with, commands received from the satellite control module 102 (420, 422). The actual and simulation model responses of each of the flywheel systems 106, including the gimbal controller 302 and hardware 310 (424, 430), the magnetic bearing controller 304 hardware 320 (426, 432), and the motor/generator controller 306 and hardware 330 (428, 434) are monitored and compared (436, 438, 440). These comparisons indicate whether or not one or more of the M active energy storage flywheel systems 106 is in an unhealthy state, or degrading toward an unhealthy state at an unacceptable rate, and should be deactivated (436).

If the comparisons indicate that one or more of the M active energy storage flywheel systems 106 should be deactivated, the prognostic processor 108, after obtain authorization from the satellite control module 102, deactivates each unhealthy, or potentially unhealthy, energy storage flywheel system 106 and associated simulation model, and activates one or more of the deactivated energy storage flywheel systems 106 and simulation models (438, 440). If the comparisons indicate that all of the M active energy storage flywheel systems 106 are sufficiently healthy, the system configuration remains unchanged, and the actual and simulation model response comparisons continue.

As was noted above, the prognostic processor 108 also schedules a periodic reconfiguration of the system 100. When this time occurs (442), the prognostic processor 108, after obtaining authorization from the satellite control module 102, deactivates one or more active energy storage flywheel systems 106, and activates one or more deactivated energy storage flywheel systems 106 to take their place (444).

The prognostic health and fault management system and method described herein that accurately determines the health and rate of degradation of the flywheel systems, and deactivates unhealthy flywheel systems and activates deactivated flywheel systems based on the determined health status and degradation rate.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An energy storage and supply system, comprising:
one or more energy storage flywheels each coupled to received one or more flywheel command signals and operable, in response thereto, to supply one or more actual flywheel response signals;
one or more simulation models of at least a portion of each energy storage flywheel, each simulation model coupled to receive the one or more flywheel command signals and operable, in response thereto, to supply one or more simulation model response signals; and
a prognostic processor coupled to receive one or more of the actual flywheel response signals and one or more of the simulation model response signals and operable, in response thereto, to supply one or more signals to selectively activate and deactivate one or more of the energy storage flywheels.

2. The system of claim 1, wherein:
the prognostic processor includes a comparator coupled to receive one or more of the actual flywheel response signals and one or more of the simulation model response signals and operable, in response thereto, to supply one or more flywheel health state signals; and
the prognostic processor supplies the one or more signals to selectively activate and deactivate one or more of the energy storage flywheels based on the one or more of the flywheel health state signals.

3. The system of claim 1 wherein:
one or more of the energy storage flywheels is in an active state and one or more of the energy storage flywheels is in a deactivated state; and
the prognostic processor is further operable to selectively activate one or more of the deactivated energy storage flywheels and deactivate one or more of the active energy storage flywheel.

4. The system of claim 1, wherein the prognostic processor supplies one or more status signals representative of an operational state of each of the flywheels.

5. The system of claim 1, wherein the prognostic processor is further operable to determine a rate of degradation of at least a portion of each of the energy storage flywheels.

6. The system of claim 1, wherein the prognostic processor is further operable to periodically supply the one or more signals to selectively activate and deactivate one or more of the energy storage flywheels.

7. The system of claim 1, wherein each energy storage flywheel further includes:
one or more magnetic bearings rotationally mounting the energy storage flywheel; and
a magnetic bearing controller coupled to receive bearing command signals and operable, in response thereto, to supply position control signals to each of the magnetic bearings.

8. The system of claim 1, wherein each energy storage flywheel further includes:
a motor/generator coupled to the energy storage flywheel to supply rotational energy to, and receive rotational energy from, the energy storage flywheel; and
a motor/generator controller coupled to receive one or more motor/generator command signals and operable, in response thereto, to supply operational control signals to the motor/generator.

9. The system of claim 1, wherein each energy storage flywheel is mounted in a gimbal frame, and wherein the system further comprises:
a gimbal controller coupled to receive attitude commands and operable, in response thereto, to supply gimbal position control signals; and
one or more actuators coupled to receive the gimbal position control signals and operable, in response thereto, to move the gimbal frame.

10. A method of monitoring the health of an energy storage and supply system having one or more energy storage flywheels, the method comprising:
supplying one or more flywheel commands to each of the energy storage flywheels and to an associated simulation model of at least a portion of each of the energy storage flywheels;
monitoring an actual response of each energy storage flywheel to each of the supplied commands;
monitoring a simulated response of each associated simulation model to each of the supplied commands;
comparing the actual response of each energy storage flywheel to the simulated response of its associated simulation model; and
selectively activating and inactivating one or more of the energy storage flywheels based on the comparison.

11. The method of claim 10, further comprising:
determining an operational status of each of the energy storage flywheels.

12. The method of claim 10, further comprising:
supplying a status signal representative of the operational state of each of the energy storage flywheels.

13. The method of claim 10, further comprising:
periodically activating and inactivating one or more of the energy storage flywheels.

14. The method of claim 10, further comprising:
determining a degradation rate of at least a portion of each energy storage flywheel.

15. The method of claim 10, wherein each of the energy storage flywheels is rotationally mounted using one or more magnetic bearings, and wherein the method further comprises:
supplying bearing command signals to each magnetic bearing and to a simulation model of each magnetic bearing;
monitoring an actual response to each bearing command signal supplied to each magnetic bearing; and
monitoring a simulated response to the to each bearing command signal supplied to each magnetic bearing simulation model.

16. The method of claim 10, wherein each of the energy storage flywheels is coupled to a motor/generator, and wherein the method further comprises:
supplying motor/generator control signals to each motor/generator and to a simulation model of each motor/generator;
monitoring an actual response to each motor/generator control signal supplied to each motor/generator; and
monitoring a simulated response to each motor/generator control signal supplied to each motor/generator simulation model.

17. The method of claim 10, wherein each energy storage flywheel is mounted in a gimbal frame, and wherein the method further comprises:
supplying attitude command signals to each gimbal frame and to a simulation model of each gimbal frame;
monitoring an actual response to each attitude command signal supplied to each actuator; and
monitoring a simulated response to each attitude command signal supplied to each gimbal frame simulation model.

18. A satellite, comprising:
a housing; and
an energy storage and supply system at least partially disposed within the housing, the energy storage and supply system comprising:
one or more energy storage flywheels each coupled to received one or more flywheel command signals and operable, in response thereto, to supply one or more actual flywheel response signals,
one or more simulation models of at least a portion of each energy storage flywheel, each simulation model coupled to receive the one or more flywheel command signals and operable, in response thereto, to supply one or more simulation model response signals, and
a prognostic processor coupled to receive one or more of the actual flywheel response signals and one or more of the simulation model response signals and operable, in response thereto, to supply one or more signals to selectively activate and deactivate one or more of the energy storage flywheels.

* * * * *

UNITED STATES PATENT AND TRADEMARK OFFICE
CERTIFICATE OF CORRECTION

PATENT NO. : 6,845,952 B2
APPLICATION NO. : 10/340480
DATED : January 25, 2005
INVENTOR(S) : Abel et al.

It is certified that error appears in the above-identified patent and that said Letters Patent is hereby corrected as shown below:

Column 1, add the following paragraph between the Title and Technical Field:

--STATEMENT REGARDING FEDERALLY SPONSORED RESEARCH OR DEVELOPMENT

This invention was made with government support under Agreement No. F29601-01-2-0046 awarded by the U.S. Air Force, Air Force Research Laboratory. The government has certain rights in this invention.--

Signed and Sealed this

Twentieth Day of March, 2007

JON W. DUDAS
*Director of the United States Patent and Trademark Office*